United States Patent [19]

Lang et al.

[11] Patent Number: 4,560,189
[45] Date of Patent: Dec. 24, 1985

[54] SEALING CONNECTION

[75] Inventors: Werner Lang, Calw; Jürgen Kretschmer, Weinstadt-Schnaidt, both of Fed. Rep. of Germany

[73] Assignee: Daimler-Benz Aktiengesellschaft, Stuttgart, Fed. Rep. of Germany

[21] Appl. No.: 558,271

[22] Filed: Dec. 5, 1983

[30] Foreign Application Priority Data

Dec. 17, 1982 [DE] Fed. Rep. of Germany ....... 3246768

[51] Int. Cl.⁴ .............................................. F16L 5/02
[52] U.S. Cl. .................................... 285/158; 285/284; 285/350; 285/347; 403/267; 403/265
[58] Field of Search ............... 285/196, 204, 200, 209, 285/212, 220, 284, 350, 347, 158; 403/267, 265, 192, 197, 242, 244; 277/1

[56] References Cited

U.S. PATENT DOCUMENTS

| 2,553,222 | 5/1951 | Wallgren et al. | 285/350 |
| 2,558,246 | 6/1951 | Gray | 285/200 |
| 2,802,503 | 8/1957 | Zupa | 285/220 |
| 3,339,014 | 8/1967 | Oxley | 285/347 |
| 3,436,109 | 4/1969 | Loose | 285/158 |

FOREIGN PATENT DOCUMENTS

| 1001483 | 1/1957 | Fed. Rep. of Germany . |
| 2819017 | 10/1979 | Fed. Rep. of Germany . |
| 1080305 | 8/1967 | United Kingdom ............... 285/369 |

Primary Examiner—Cornelius J. Husar
Assistant Examiner—Eric K. Nicholson
Attorney, Agent, or Firm—Barnes & Thornburg

[57] ABSTRACT

A gas and fluid sealing connection and process for making same are disclosed for connecting between a synthetic resinous material/plastic material body and a metallic body which is embedded therein by flowing the synthetic material in a form under pressure. The metallic body has at least one circumferential groove at its outer side. At least one of the grooves disposed in the region of the plastic to be embedded there is disposed and carried an elastomeric ring which fills the groove in the axial direction and the groove is so shaped that the ring is left with an expansion gap space in the region of the groove bottom. Alternative embodiments dispense with the expansion gap space and utilize a ring which is formed out of closed pore elastomeric foam.

22 Claims, 5 Drawing Figures

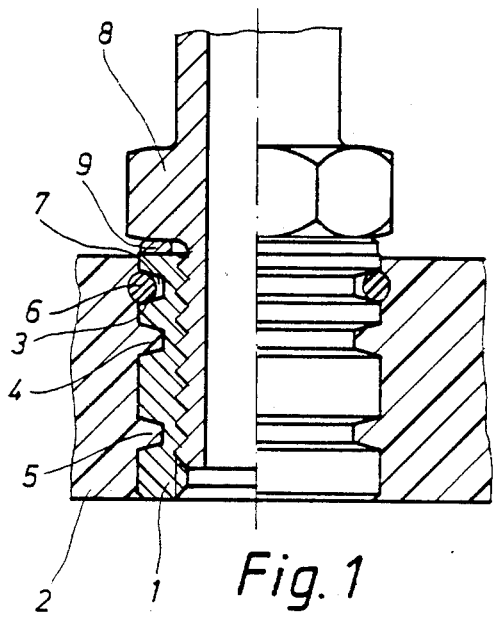
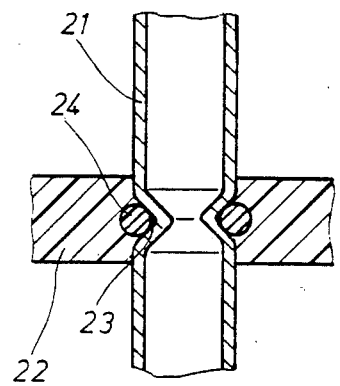
Fig. 1
Fig. 2
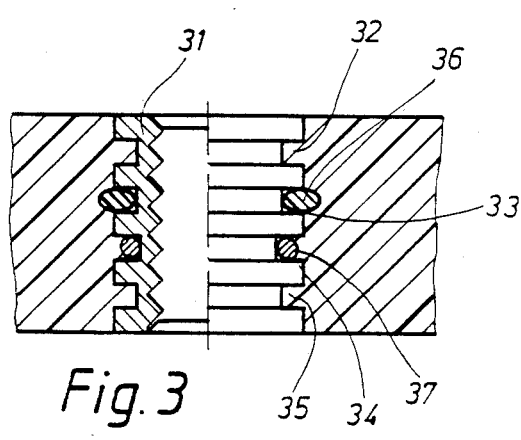
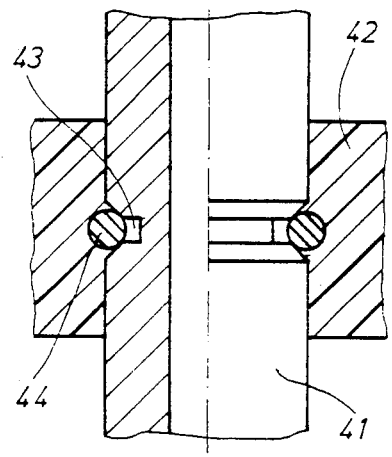
Fig. 3
Fig. 4
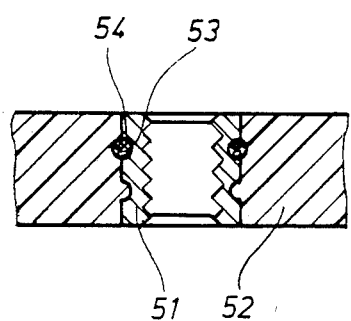
Fig. 5

SEALING CONNECTION

BACKGROUND AND SUMMARY OF THE INVENTION

The invention relates to a gas and fluid sealing connection between a plastic body and a metallic body which is embedded into the plastic body by means of flowing the plastic synthetic material mass under pressure in a form. The invention relates also to the method of forming such a connection.

The gas and fluid sealing connection of metallic bodies, for example, pipes or threaded inserts, with a plastic body by means of extrusion coating of the metallic body by the plastic material under pressure or by flowing the plastic material around the metallic body in a form involves large difficulties. Especially with changing temperatures, because of the different thermal coefficients of elongation between the plastic and the metallic material, gaps or slots are formed through which the gas or fluid medium can flow from one side of the completed plastic body to the other side. Also, the known arrangements, involving the formation of grooves in the outer surface of the metallic body or the use of metallic bodies with wavy, rippled or knurled outer surfaces to improve the gas fluid sealing of the connection between the plastic and the metal, are unreliable over a long period of time.

It is already known from DE-AS (German Examined Published Application) 10 01 483 to provide the outer skin or surface of the metal part to be embedded with sintering or injection of a highly porous metal surface. The sealing connection between the thus prepared metal part and a plastic part is accomplished with a connection layer, such as soldering, between the plastic material and the porous metal surface. This particular process demands several additional manufacturing stages and therefore is also correspondingly expensive.

Furthermore, it is also known from DE-PS (German Patent) 28 19 017 to insert a pipe in the plastic, the wall strength of which pipe is so selected that it is physically deformed under the plastic injection pressure. Such a process is usable for only a small range of constructions because of the required thin wall strength of the metal part to be embedded.

The invention is based on the problems of providing a gas fluid sealing connection between a plastic body and a metallic body to be embedded therein by flowing around of the plastic material under pressure. The invention is further based on the problem of providing a process for manufacturing a gas and fluid sealing embedding of a metallic body in a synthetic material body, which process is simple and useable for a wide range of applications and which avoids the occurance of sealing losses.

These problems are solved, according to preferred embodiments of the invention, by providing the metallic part to be embedded with a groove on its outer surface and placing an elastomeric sealing ring in the groove prior to applying the plastic material under pressure. In certain preferred embodiments, the elastomeric sealing ring is dimensioned to fill the axial (direction of the tube or other metallic insert to be embedded) extent of the groove in the metallic part while being spaced from the bottom of the groove, the groove bottom serving as an expansion volume space which accommodates inward movement of the sealing ring during the application of the plastic. In other preferred embodiments the sealing ring fills the groove in the metallic part but is formed of closed pore elastomeric foam so as to form to own expansion volume to accomodate the application of the plastic under pressure.

At the connections, according to the invention, a circumferential groove is provided in the region of the metallic body to be embedded, which groove carries the ring of elastomeric material and which elastomeric ring fills the groove in the axial direction, whereby the groove is so shaped that it possesses an expansion volume in the region of the bottom of the groove which is not filled by the elastomeric ring. During the embedding process, when the metal body is subjected to synthetic material plastic mass under pressure, the ring can expand into this expansion volume and, after the hardening of the plastic material, develops the necessary return resilience to assure the sealing connection. In the event that a ring made out of closed pore elastomeric foam is used, the expansion volume is not needed.

The manufacture of such a sealing connection proceeds as follows: The metal body to be embedded is provided in a normal manner in the area where it is to be connected with the plastic material with one or several circumferential grooves. In at least one of these grooves there is placed an elastic sealing ring which fills that groove in the axial direction and is formed of temperature resistant elastomeric material. It is important to assure that the groove accommodating the sealing ring is so shaped that it possesses an expansion volume which is not filled by the elastic ring in the region at the bottom of the groove. The metallic body, together with the sealing ring, is then placed in the necessary apparatus for the manufacture of the plastic part, which apparatus (for example, an injection molding form) is closed and the metallic body is then embedded under pressure in the plastic material disposed in the form of injected into the form. The pressure in the form of mold compresses the elastic sealing ring in such a manner that upon the hardening of the casting material an excellent sealing strength results with a return resilience pressure of the sealing material. In order to facilitate this spring back resiliance, the groove must be so shaped that it possesses an expansion volume in the region of the bottom of the groove which is not filled by the ring so that a compression of the sealing ring is facilitated. In order to assure that the plastic material does not flow into the expansion volume space during the embedding process, the sealing ring must fill the groove in the axial direction and thereby protect the expansion volume against the entry of the plastic material. It is especially advantageous if the groove is formed as a wedge groove wider at the outside surface. It is contemplated by the invention to have embodiments with several grooves and associated sealing rings embedded in same. The sealing effect is thereby increased, however it is in such case necessary that the plastic material body exhibit a large wall strength in order to accommodate these additional seals.

Embodiments of the invention are also contemplated with the expansion volume in the region of the bottom of the groove dispensed with and instead a sealing ring is used which is formed out of closed pore elastomeric foam. In this case the "expansion volume" occurs inside the sealing ring itself because the pores of the foam serve as the expansion accomodating volume.

Preferred plastic body material to be used with the invention include plastic synthetic material, for example polyolefin, polyvinylchloride, polystyrol, polymethylmetacrylate, polyacetate, polycarbonate, polyathylenterephtalate, polyamide, as well as duroplastic synthetic material, for example phenolformaldehyde-pressing mass, polyetherresin, epoxideresin, melamineresin, or plastic or heat platified unfinished plastic (extrusion). It is important that the metallic body is surrounded in the form or mold by the plastic mass under pressure, whereby the sealing ring develops a return resilience after the hardening of the plastic mass.

As material for the sealing ring, the normal elastomeric materials should be used. Primary materials for the sealing ring include the natural butyl-, nitril-, chlorprene- rubbers, acrylic and silicone fluid, thiokol rubber and fluoro-elastomers. The selection of these sealing materials should be made with a view to the temperature at which the embeddment of the plastic body takes place as well as with a view to the characteristics of the material which will be sealed against during use of the sealing connection.

Further objects, features, and advantages of the present invention will become more apparent from the following description when taken in connection with the accompanying drawings which show, for purposes of illustration only, an embodiment in accordance with the present invention.

BRIEF DESCRIPTION OF THE DRAWINGS

FIG. 1 is a part sectional view of a sealing connection between a metallic body and a plastic body, constructed in accordance with a first preferred embodiment of the present invention;

FIG. 2 is a part sectional view of a sealing connection between a metallic body and a plastic body, constructed in accordance with a second preferred embodiment of the present invention;

FIG. 3 is a part sectional view of a sealing connection between a metallic body and a plastic body, constructed in accordance with a third preferred embodiment of the present invention;

FIG. 4 is a part sectional view of a sealing connection between a metallic body and a plastic body, constructed in accordance with a fourth preferred embodiment of the present invention; and FIG. 5 a part sectional view of a sealing connection between a metallic body and a plastic body, constructed in accordance with a fifth preferred embodiment of the present invention.

DETAILED DESCRIPTION OF THE DRAWINGS

FIG. 1 is a part sectional view showing a threaded metallic insert 1 embedded in a synthetic material wall 2. The threaded insert 1 is provided on its outer surface with three wedge shaped ring grooves 3, 4, and 5. In the groove 3 there is disposed an elastic sealing ring 6 made from chloroprene rubber, which ring 6 fills the goove 3 in the axial direction so that the sealing ring is pressed firmly against the flanks of the ring groove 3. Under or behind the sealing ring 6 an expansion or escape volume 7 is formed in the region of the bottom of the groove 3. During an injection embedding of the threaded insert 1, the sealing ring 6 is pressed under elastic deformation partly into the expansion volume 7 and is so disposed to carry out its sealing effect. For purpose of the illustration of the use for the connection, the insert 1 is shown threadably connected with a pipe connecting piece 8, which piece 8 is sealed with respect to the threaded insert 1 by means of a flat seal 9.

FIG. 2 shows a pipe 21 extending through a synthetic material (plastic) wall 22, wherein the pipe 21 exhibits a neck or constriction 23 in which the sealing ring 24 is disposed, constriction 23 having a triangular cross section, formed by rolling.

FIG. 3 shows in half section a further metallic threaded insert 31 with four ring grooves, 32, 33, 34, and 35, each having a rectangular cross section. The grooves 33 and 34 are provided respectively with an oval shaped sealing ring 36 and a round sealing ring 37. The sealing ring 37 is disposed substantially inside the ring groove 34, which means that the ring 37 is disposed so far toward the inside of the groove 34 that the remaining outwardly disposed cross section of the groove 34 is filled with plastic material during the embedding process. In this arrangement the groove 34 also serves in an advantageous manner to anchor the metal body in the plastic body.

FIG. 4 shows in half section a metallic through pipe 41 embedded in a synthetic material wall 42. Pipe 41 has a wedge shaped groove, which in the region of the groove bottom possesses a rectangular cross section expansion volume 43. Sealing ring 44 is inserted in the groove so that it can be compressed under the effect of the injection pressure into the expansion or escape volume 43.

Lastly, FIG. 5 shows furthermore a threaded metallic insert 51 in a plastic material wall 52. In ring groove 53 there is inserted a sealing ring 54 made out of closed pore elastomeric foam. In this case, the expansion volume in the region of the bottom of the groove can be dispensed with because the sealing ring has its own expansion volume in the form of the closed pores already in it.

While we have shown and described several embodiments in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

What is claimed is:

1. A gas and fluid sealing connection comprising:
    a metallic body having at least one groove formed in its outer surface,
    an elastomeric sealing ring disposed in said groove and configured to seal the inside of the groove from the adjacent outer surface of the metallic body while accomodating compression of the sealing ring in the direction of the bottom of the groove, and
    embedding plastic applied to the outer surface of the metallic body in the area of the groove to form a plastic body wall member with said metallic body embedded in the plastic and said sealing ring compressed by the plastic to form a gas and fluid seal between the plastic body wall member and the metallic body.

2. A gas and fluid sealing connection according to claim 1, wherein the groove is formed as a wedge shaped groove which is widest at its outwardly disposed sides.

3. A gas and fluid sealing connection according to claim 1, wherein the elastic sealing ring is formed of closed pore elastomeric foam, said foam accommodating the compression of the sealing ring during embedding of the metallic insert in the 4. A gas and fluid sealing connection according to claim 1, wherein the elastomeric sealing ring is configured to be spaced from the bottom of the groove so that said sealing ring can be compressed to expand into the bottom groove space during embedding of the metallic insert in the pastic.

5. A gas and fluid sealing connection according to claim 2, wherein the elastomeric sealing ring is configured to be spaced from the bottom of the groove so that said sealing ring can be compressed to expand into the bottom groove space during embedding of the metallic insert in the pastic.

6. A gas and fluid sealing connection according to claim 1, wherein said metallic body is a fluid flow accomodating tube which extends through the plastic wall member.

7. A gas and fluid sealing connection according to claim 1, wherein the metallic body is a threaded insert for accomodating the threaded connection of a fluid flow accomodating tube.

8. A gas and fluid sealing connection according to claim 1, wherein the metallic body is a hollow body having an outer cylindrical surface, and wherein several circumferential grooves are provided in the body to accomodate flow of plastic therein during embedding into the plastic body wall member, the plastic flowing into said grooves serving to aid in anchoring the metal body in said wall member.

9. A gas and fluid sealing connection according to claim 8, wherein two of said grooves are provided with said elastomeric sealing rings.

10. A gas and fluid sealing connection according to claim 8, wherein one of said grooves is provided with one of said elastomeric sealing rings that is disposed completely inside the groove so that said goove can also serve as an anchoring groove.

11. A gas and fluid sealing connection according to claim 7, wherein said groove for the elastomeric sealing ring is formed by a necked constriction rolled into the exterior of the tube.

12. A process for manufacturing a gas and fluid sealing connection between a metallic body having at least one groove at the outer surface thereof and a plastic body, said process comprising:

inserting an elastomeric sealing ring in one of the grooves to seal the bottom of the groove from the outside while permitting compression of the sealing ring in the direction of the groove bottom, and subsequently applying the plastic for the plastic body under pressure to the outside of the metallic body in the region of the groove, whereby the sealing ring is compressed to form a resilient compressed sealing connection between the plastic body and the metallic body insert embedded therein.

13. A process according to claim 12, wherein the groove is formed as a wedge shaped groove which is widest at its outwardly disposed sides.

14. A process according to claim 12, wherein the elastic sealing ring is formed of closed pore elastomeric foam, said foam accommodating the compression of the sealing ring during embedding of the metallic insert in the plastic.

15. A process according to claim 12, wherein the elastomeric sealing ring is configured to be spaced from the bottom of the groove so that said sealing ring can be compressed to expand into the bottom groove space during embedding of the metallic insert in the plastic.

16. A process according to claim 15, wherein the groove is formed as a wedge shaped groove which is widest at its outwardly disposed sides.

17. A process according to claim 12, wherein said metallic body is a fluid flow accomodating tube which extends through the plastic wall member.

18. A process according to claim 12, wherein the metallic body is a threaded insert for accomodating the threaded connection of a fluid flow accomodating tube.

19. A process according to claim 12, wherein the metallic body is a hollow body having an outer cylindrical surface, and wherein several circumferential grooves are provided in the body to accomodate flow of plastic therein during embedding into the plastic body wall member, the plastic flowing into said grooves serving to aid in anchoring the metal body in said wall member.

20. A process according to claim 19, wherein two of said grooves are provided with said elastomeric sealing rings.

21. A process according to claim 19, wherein one of said grooves is provided with one of said elastomeric sealing rings that is disposed completely inside the groove so that said goove can also serve as an anchoring groove.

22. A process according to claim 18, wherein said groove for the elastomeric sealing ring is formed by a necked constriction rolled into the exterior of the tube.

* * * * *

UNITED STATES PATENT AND TRADEMARK OFFICE
CERTIFICATE OF CORRECTION

PATENT NO. : 4,560,189

DATED : December 24, 1985

INVENTOR(S) : Werner Lang, et al.

It is certified that error appears in the above-identified patent and that said Letters Patent is hereby corrected as shown below:

Column 5, line 3, after "in the" add --plastic--;

Signed and Sealed this

Thirteenth Day of May 1986

[SEAL]

Attest:

DONALD J. QUIGG

Attesting Officer

Commissioner of Patents and Trademarks